INVENTORS
William McGraw
Richard Woodward
By
Russell A. Graham
ATTORNEY

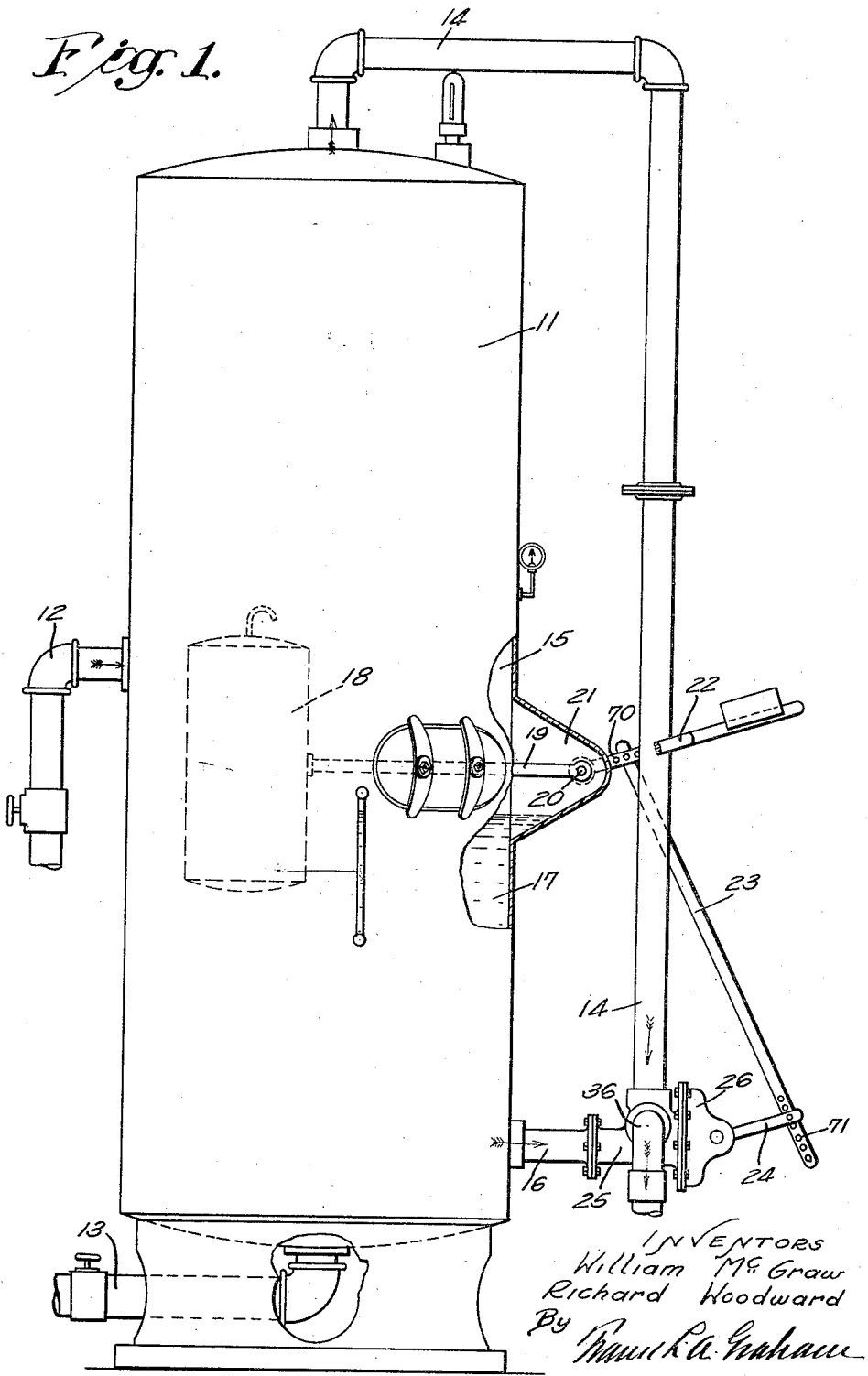

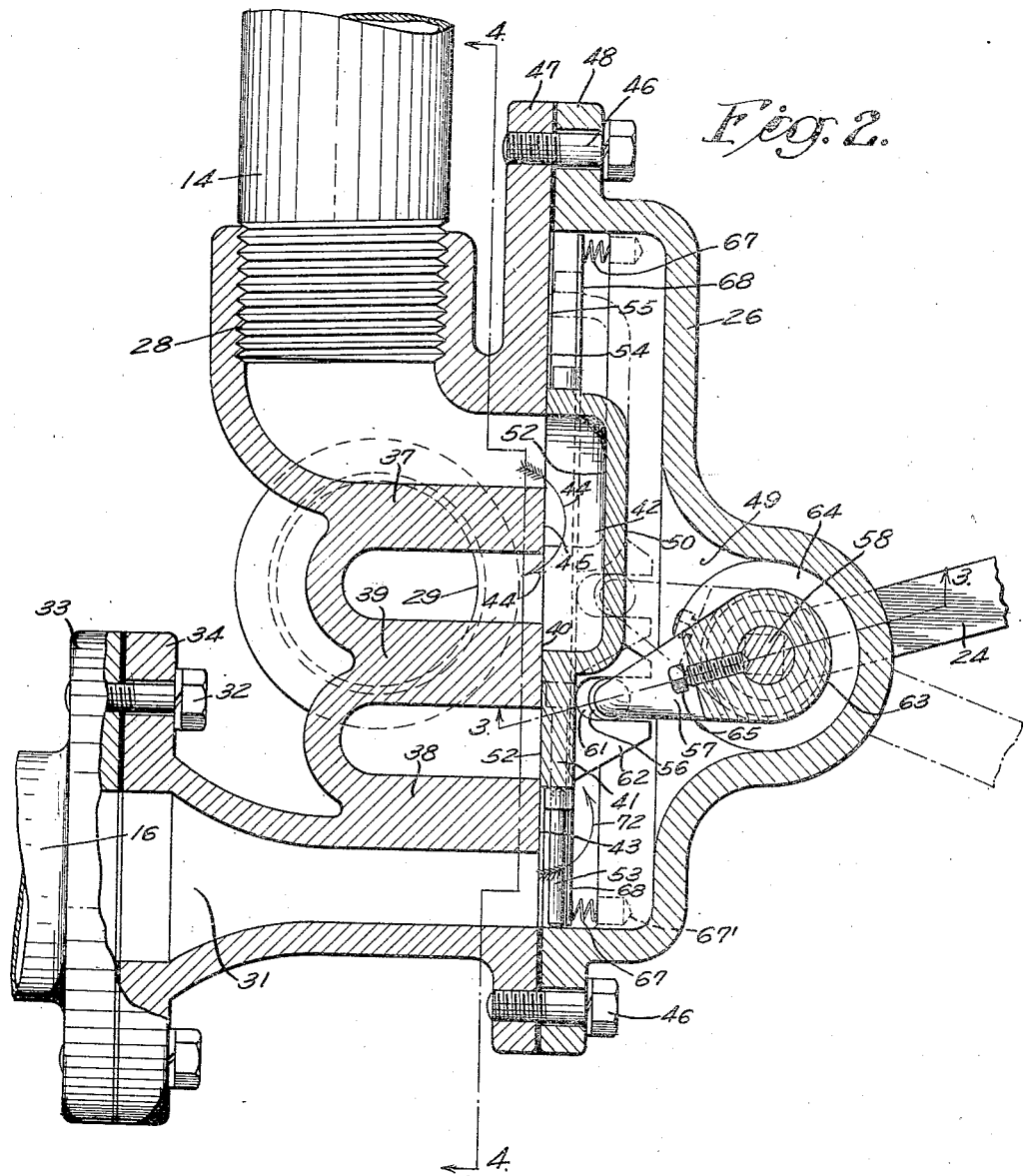

Patented June 21, 1932

1,863,759

UNITED STATES PATENT OFFICE

WILLIAM McGRAW AND RICHARD WOODWARD, OF LOS ANGELES, CALIFORNIA, ASSIGNORS TO TRUMBLE GAS TRAP COMPANY, A COPARTNERSHIP COMPOSED OF FRANCIS M. TOWNSEND, A. J. GUTZLER, AND MILAN J. TRUMBLE

SLIDING CLOSURE UNIT AND GAS TRAP CONTROL SYSTEM

Application filed March 11, 1926. Serial No. 93,840.

It is an object of this invention to provide means whereby the advance or retraction of a slidable plate, as by engagement of cam fingers with suitably slotted lugs or projections thereon, may be effective simultaneously to control the flow through a plurality of openings,—a passage for gas, or the like, being diminished as a passage for oil, or the like, is increased, and means being provided whereby the pressure of one of said fluids is admitted to both sides of said plate.

As above implied, it is an object of this invention to provide a closure of the general type referred to which is suitable for use on gas traps, or the like, and in which the pressure of the oil or other liquid whose level is to be controlled is so distributed or compensated as to assure a desired sensitiveness and ease of operation; and preferred embodiments of our invention may each comprise a unit including a main casting, or the like, suitable for use externally of a gas trap, said unit (and preferably its main casting) being provided with a gas inlet and a gas outlet and also with an oil inlet and an oil outlet,—each outlet being separated from the corresponding inlet by a web or partition across one end of which the mentioned plate (so shaped as to diminish one fluid passage as it increases with the other) is movable.

It is a further object of this invention to provide a closure plate, of the general character indicated, with means admitting oil pressure to a larger (back) area thereof than is exposed to opposing pressures; and, to provide for an approximate or partial equalization or compensation of pressures, we may, in preferred embodiments of our invention, employing a plate which is adapted at all times to prevent entrance of oil into a gas line, use therewith fixed stops and also resilient means, such as compression springs, tending to hold said plate, regardless of its position of adjustment, in immediate contact with cooperating surfaces,—this construction incidentally obviating such leakage as might otherwise result from wear.

It is an especial object of this invention to provide a sliding closure suitable for embodiment in comparatively light and highly efficient gas separators such as are suitable for installation even in elevated positions,—in which back pressures are diminished; but all embodiments of our invention preferably include sliding closures which, whether movable in a vertical or in another plane, are adapted to close or diminish one passage incidentally to the opening of another,—the parts being so disposed as at all times to assure the operator against entrance of oil into a gas line, and a shifting of the mentioned slidable plate being automatically effected incidentally to changes in the level of a suitable float connected with a lever, or the like, by which said plate is movable.

Other objects of our invention, including the use, with the mentioned main casting, of a secondary or complemental casting which provides bearings for said lever and is removable to permit access to said plate and/or other interior parts (as for the purpose of cleaning, adjustment, repair, or replacement) may be best appreciated from the following description of an illustrative embodiment of our invention, taken in connection with the appended claims and the accompanying drawings, in which Fig. 1 is a elevational view of a gas separator equipped with control means including one of our sliding closures,—parts of a separator body being broken away, to show the liquid whose level is to be controlled, and parts movable thereby.

Fig. 2 is a view corresponding with the lower right hand portion of Fig. 1, showing essential parts as in vertical section, and on an enlarged scale.

Figure 4:
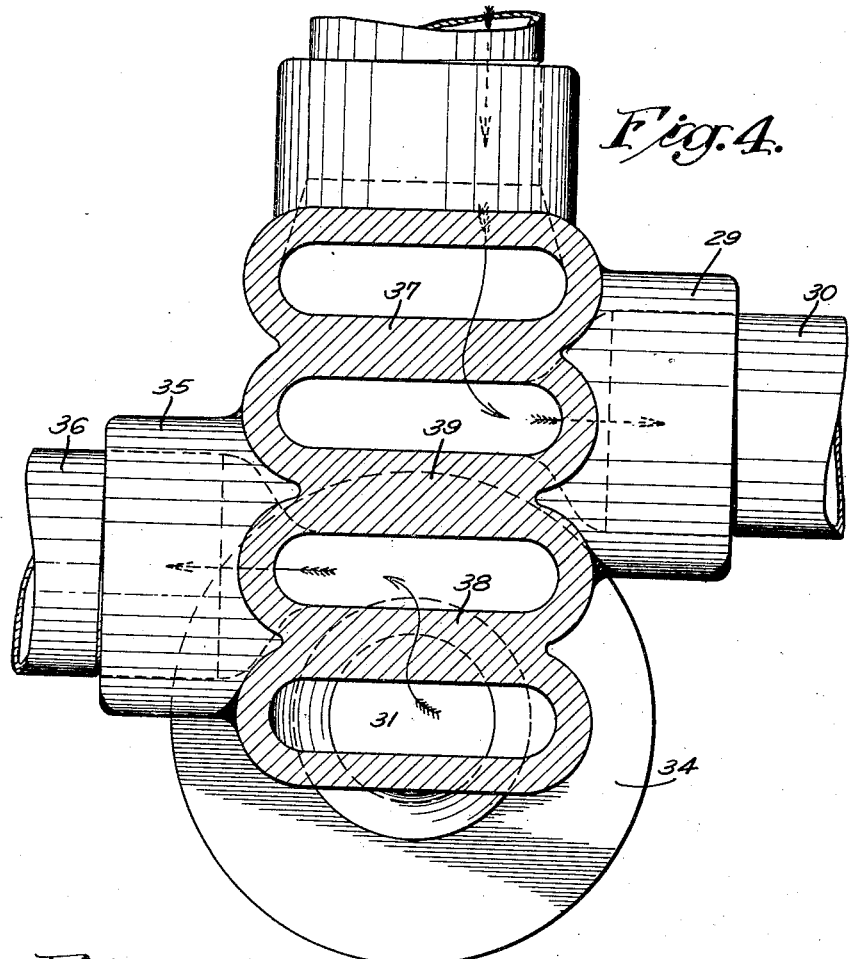
Fig. 4 is a vertical section, taken substantially as indicated by the line 4—4 of Fig. 2.

Referring to the details of that specific embodiment of our invention chosen for purposes of illustration, 11 may be referred to as the main tank or casing of a gas separator, shown as provided with a valved inlet 12, and with a sand draw-off 13, in addition to a gas outlet 14 (communicating with a gas space 15) and with an oil or liquid outlet 16 (communicating with an oil or liquid space 17).

Figure 3:
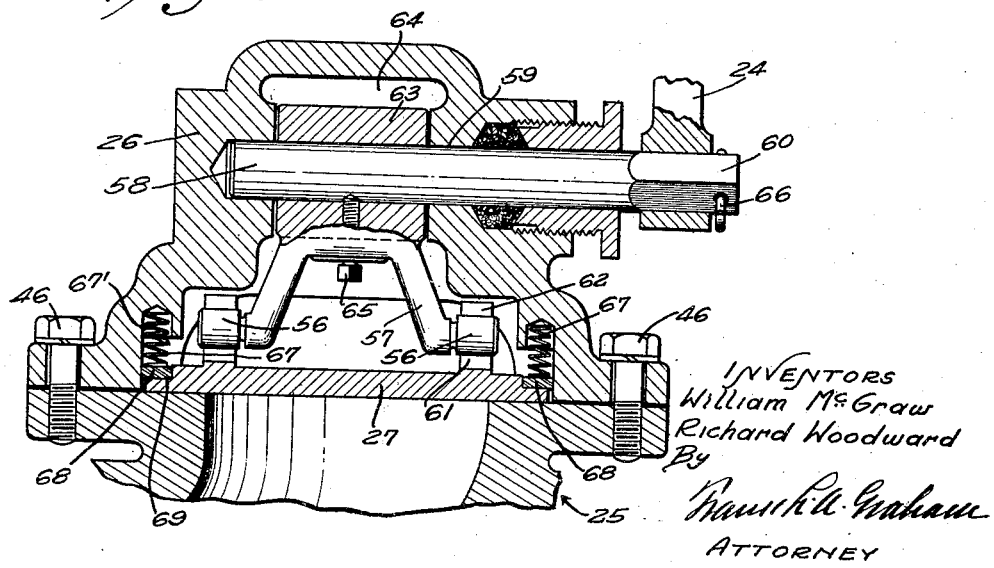
Fig. 3 is a detailed sectional view, taken substantially as indicated by the line 3—3 of Fig. 2.

The tank 11 being shown as equipped with a float 18 on an arm 19, which is rigidly connected with a shaft 20, suitably packed and projecting through a wall 21 in such manner as to impart movement to a counter-balancing arm 22, means such as an interposed rod or link 23 may be employed to impart movement, as by engagement of an arm or lever 24, to a relatively movable part or parts confined within one of our novel units and within or between a main casting or member 25 and/or a subsidiary casting or member 26,—said moving parts preferably including a slidable plate 27, of the general character illustrated in Figs. 2 and 3 and adapted simultaneously to control both the flow of gas or vapor through the pipe 14, or its equivalent, and the flow of oil, or another liquid, through the pipe 16, or its equivalent,—and said gas and oil being, in this use of our invention, under the same pressure.

As best shown in Figs. 2 and 4, the main casting 25 may comprise not only a threaded inlet opening 28, to receive the gas inlet pipe 14, or its equivalent, and a threaded outlet opening 29, to receive a gas delivery pipe 30 but also an oil inlet opening 31, shown as secured (by bolts 32, extending through flanges 33 and 34) to the oil pipe 16 and a threaded oil outlet opening 35, to receive an oil delivery pipe 36,—the respective outlet pipes 30 and 36 being shown as disposed at right angles to the mentioned inlet pipes; and the respective inlet passages may be separated from the corresponding outlet passages by means of webs or partitions 37 and 38, terminating in a common plane in such manner as to render both the flow of gas and the flow of oil dependent upon the position of adjustment of the mentioned plate 27, or its equivalent.

In Fig. 2, a web or partition 39 is shown as extending parallel with the mentioned webs or partitions 37 and 38, and as terminating, at 40, in the same plane therewith; and the slidable plate 27 is shown as comprising not only a substantially flat section 41, but a cupped or concave section 42 forming a communicative port, the shape and extent of these respective sections being such that whenever the said plate occupies one extreme position, such as that in which it is illustrated in solid lines in Fig. 2, the flow of oil is completely cut off, (by the contact of the flat section 41 with the correspondingly flattened ends 40, 43 of the webs or partitions 39 and 38) although, at the time referred to, an unobstructed outflow of gas is permitted (substantially as indicated by the arrow 44) by reason of the fact that the cupping of the concave section 42 of the slidable plate 27, shown as imperforate, permits a free flow of gas past the end 45 of the partition 37.

In order that pressure of one of the mentioned fluids (as, the pressure of the oil,—forced out by gas pressure built up within the casing 11, or its equivalent) may at all times be admitted to what may be termed the back or outer side of plate 27, we prefer to so shape the cap or subsidiary casting 26 (shown as secured by bolts 46, extending through flanges 47 and 48) as to provide a compensating or back pressure space 49,—the total area of the back or outer surface 50 of the slide 27, or its equivalent, exposed to such back pressure being preferably somewhat greater than the sum of the oppositely exposed surfaces 52; and means such as threaded stop fingers 53, secured to one of the mentioned castings or to the "lower" edge of the plate 27, may be used not only to so limit the movement of this plate, or its equivalent, relatively to the passage 31, as to assure a free admission of oil, or other liquid, at all times to the pressure space 49, but to prevent, at all times, admission of oil to the gas inlet 28 or outlet 29.

It will be seen that the plate 27 is slidably movable from the position in which it is shown in Fig. 2, in full lines, only toward the alternative position indicated in dotted lines; and that such movement, however initiated or completed, may be effective to carry the flat portion 41 of the plate 27 partly or completely across the gas outlet passage, checking and/or ultimately preventing outflow of gas whenever the plate 27 is moved to its dotted line position, as for the purpose of permitting an outflow of accumulated oil,—the oil outlet being preferably permitted to open some distance before the gas outlet is appreciably diminished, and the oil passage being thus variable, within limits, even while the gas passage remains wide open. A flat surface is preferably provided at 54, in the same plane with the flat surfaces 40, 43 and 45, for engagement at all times by a cooperating edge or surface 55, provided adjacent the cup section 42 of the plate 27; and, flow of one of the mentioned fluids being, by the described means, always checked (although not necessarily cut completely off) whenever free flow of the other is permitted, movement of the plate 27 in response to movements of the arm or lever 24 (as operated from the float 18, or its equivalent, by intermediate means of the general character referred to) may be effected by, for example, cam fingers 56, on arms 57, movable by means such as a shaft 58. This shaft is shown as extending through a suitably packed bearing 59 and as provided with a squared head 60, to carry the mentioned arm or lever 24,—said cam fingers 56 being shown as adapted to enter cam slots 61 in lugs 62, projecting from the back of the plate 27. The arms 57, carrying cam fingers 56, are shown as integral with a block 63, about which extends a pressure passage 64, permitting automatic lubrication, said block being secured to the shaft 58, if not integral therewith, by means such as a set screw 65; and accidental displacement of the arm or lever 24 from the non-circular end 60 of the shaft 58 may be prevented by means such as a mere cotter pin 66.

In order reliably to hold plate 27 at all times down against the surfaces 40, 43, 45 and 54, shown as lying in a common vertical plane, and/or to provide, if desired, additional back pressure on plate 27,—also providing for an automatic compensation for wear—we suggest the use of additional and resilient means such as compression springs 67,—shown as retained in depressions 67' and as acting upon the ends of practically rigid bars 68. These bars may lie in grooves 69, and may, in that case, extend longitudinally of the edges of the plate 27; but it should be understood that, for purposes of adjustment, as, for the establishment and maintenance of a desired level of oil, or other liquid, within the casing 11, or for the adaptation of our described organization to use with different fluids, maintaining its sensitiveness under varying conditions of pressure, we may rely chiefly or entirely upon variations in the point or points of attachment of the link or bar 23, or its equivalent, to the respective arms or levers 22 and 24,—the arm or lever 22 being shown as provided with a row of holes 70, for alternative use, and the link or bar 23 being shown as provided with a row of holes 71,—so positioned as to provide for wide ranges of relative adjustment.

When an organization using a single slidable closure plate of the described general character (so extending across a plurality of passages as to control the flow of two separate fluid) is used in the described manner in connection with a gas trap, it will be seen that so long as the float 18 occupies a position such as that, or below that, in which it is shown in Fig. 1, the escape of oil, or the like, by a movement such as is suggested by the arrow 72, Fig. 2, is prevented, although gas may freely escape by a path such as is indicated by the mentioned arrow 44. As oil, or another liquid, accumulates in the tank or casing 11, lifting the float 18 above its indicated position, a consequent lifting of the plate 27 is however effective to permit an outflow of oil, until the level of the same drops to substantially the level indicated in Fig. 1. Thus, whether the oil outlet pipe 36 extends upward or downward, occasioning much resistance or little resistance to the outflow of oil, a gas pressure sufficient to maintain a practically constant level within the casing 11 may be reliably built up and maintained; gas may be prevented from entering, at any time, the oil line (the oil outlet being always submerged); and, although the oil is at all times admitted to the space 49, back of the plate 27, it is never enabled to enter the gas feed pipe 29 or the gas delivery pipe 30, or its equivalent.

Although we have herein described a single complete embodiment of our invention, it should be understood not only that various features thereof may be independently used but also that numerous modifications might be made by those skilled in the art to which this case relates, without the slightest departure from the spirit and scope of this invention, as the same is indicated above and in the following claims.

We claim as our invention:

1. In a device of the general character described: a main member provided with an inlet and an outlet for a first fluid, and with an inlet and an outlet for a second fluid; separate conduits connected with each of said inlets and outlets; a subsidiary member removably secured to said main member; a slidable closure plate housed within said subsidiary member and slidably movable over some of said inlets and outlets to alternately close the outlet for one fluid when the inlet and the outlet for the other fluid are connected; and means for so moving said plate.

2. In a valve structure for simultaneously controlling the separate flow of gas and oil, a main member having an oil inlet and a gas inlet, separate outlets for the oil and gas arranged between the respective inlets, a subsidiary member on said main member, a valve member in said subsidiary member slidable over one inlet and both outlets arranged to close the oil outlet when the gas inlet and outlet are open, and means for operating said valve member.

3. In a device of the general character described: a main member provided with an inlet and an outlet for a first fluid, and with an inlet and outlet for a second fluid; separate conduits connected with each of said inlets and outlets; a subsidiary member removably secured to said main member; a slidable closure plate housed in said subsidiary member and slidably movable over some of said inlets and outlets to alternately close the outlet for one fluid when the inlet and outlet for the other fluid are connected; and means for so moving said plate, said plate being limited in its movement so as to leave an inlet for one fluid open throughout movement of the plate to admit fluid at all times to the back of said plate.

4. In a device of the general character described: a main member provided with an inlet and an outlet for a first fluid and an inlet and an outlet for a second fluid; separate conduits connected with each of said inlets and outlets; a subsidiary member removably secured to said main member; a slidable closure plate housed in said subsidiary member and slidably movable over some of said inlets and outlets to alternately close the outlet for one fluid when the inlet and outlet for the other fluid are connected; and means for so moving said plate, said plate being provided with resilient means acting upon the back thereof to prevent leakage.

5. A float controlled valve organization adapted to be mounted upon a gas trap, comprising: a main member provided with a liquid inlet and a liquid outlet and with a gas inlet and a gas outlet; a subsidiary member removably secured to said main member; a slidable closure plate housed within said subsidiary member and slidably movable over said inlets and outlets to close the liquid outlet when the gas inlet and outlet are open; a float actuated by liquid in said trap; and means operated by said float for so moving said plate; said plate being provided with slotted members engageable by float actuated arms.

In testimony whereof, we have hereunto set our hands at Los Angeles, California, this 1st day of March, 1926.

WILLIAM McGRAW.
RICHARD WOODWARD.